United States Patent
Horn et al.

(10) Patent No.: US 9,549,367 B2
(45) Date of Patent: Jan. 17, 2017

(54) UTILIZING BROADCAST SIGNALS TO CONVEY RESTRICTED ASSOCIATION INFORMATION

(71) Applicant: QUALCOMM Incorporated, San Diego, CA (US)

(72) Inventors: Gavin B. Horn, La Jolla, CA (US); Fatih Ulupinar, San Diego, CA (US); Parag A. Agashe, San Diego, CA (US); Rajat Prakash, San Diego, CA (US); Aamod Khandekar, San Diego, CA (US); Alexei Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/484,932

(22) Filed: Sep. 12, 2014

(65) Prior Publication Data
US 2015/0029930 A1   Jan. 29, 2015

Related U.S. Application Data

(62) Division of application No. 12/269,637, filed on Nov. 12, 2008, now Pat. No. 8,848,656.
(Continued)

(51) Int. Cl.
*H04W 4/00* (2009.01)
*H04W 48/10* (2009.01)
(Continued)

(52) U.S. Cl.
CPC ......... *H04W 48/10* (2013.01); *H04W 36/0061* (2013.01); *H04W 48/02* (2013.01);
(Continued)

(58) Field of Classification Search
USPC .......................................... 370/312
See application file for complete search history.

(56) References Cited

U.S. PATENT DOCUMENTS

| | | |
|---|---|---|
| 5,535,424 A | 7/1996 | De Seze et al. |
| 5,640,677 A | 6/1997 | Karlsson |

(Continued)

FOREIGN PATENT DOCUMENTS

| | | |
|---|---|---|
| CN | 1110457 A | 10/1995 |
| CN | 1675954 A | 9/2005 |

(Continued)

OTHER PUBLICATIONS

Taiwan Search Report—TW101147975—TIPO—Jul. 9, 2014.
(Continued)

*Primary Examiner* — Farah Faroul

(57) ABSTRACT

Systems and methodologies are described that facilitate transmitting access point types and/or restricted association parameters using broadcast signals, such as beacons, pilot signals, etc. The type or restricted association information can be indicated by one or more intrinsic aspects of the signal, such as specified parameters. In addition, the type or information can be indicated by one or more extrinsic signal aspects, such as frequency, interval, periodicity, etc. Using this information, a mobile device can determine whether an access point implements restricted association. If so, the mobile device can request an access point or related group identifier before determining whether to establish connection therewith. The identifier can be verified against a list of accessible access points and/or groups to make the determination.

30 Claims, 12 Drawing Sheets

Related U.S. Application Data

(60) Provisional application No. 60/988,631, filed on Nov. 16, 2007, provisional application No. 60/988,641, filed on Nov. 16, 2007, provisional application No. 60/988,649, filed on Nov. 16, 2007, provisional application No. 61/025,093, filed on Jan. 31, 2008.

(51) Int. Cl.
  *H04W 48/02* (2009.01)
  *H04W 36/00* (2009.01)
  *H04W 4/06* (2009.01)
  *H04W 36/08* (2009.01)
  *H04W 48/08* (2009.01)

(52) U.S. Cl.
  CPC .............. *H04W 4/06* (2013.01); *H04W 36/08* (2013.01); *H04W 48/08* (2013.01)

(56) References Cited

U.S. PATENT DOCUMENTS

| | | |
|---|---|---|
| 5,722,072 A | 2/1998 | Crichton et al. |
| 5,778,316 A | 7/1998 | Persson et al. |
| 5,896,373 A | 4/1999 | Mitts et al. |
| 5,930,710 A | 7/1999 | Sawyer et al. |
| 6,067,460 A | 5/2000 | Alanara et al. |
| 6,151,484 A | 11/2000 | Ramesh |
| 6,516,193 B1 | 2/2003 | Salmela et al. |
| 6,529,491 B1 | 3/2003 | Chang et al. |
| 6,542,744 B1 | 4/2003 | Lin |
| 6,717,925 B1 | 4/2004 | Leppisaari et al. |
| 6,751,460 B2 | 6/2004 | Korpela et al. |
| 6,792,284 B1 | 9/2004 | Dalsgaard et al. |
| 7,047,009 B2 | 5/2006 | Laroia et al. |
| 7,289,473 B1 | 10/2007 | Padovani et al. |
| 7,336,949 B2 | 2/2008 | Nasielski |
| 7,379,739 B2 | 5/2008 | Rajkotia et al. |
| 7,480,265 B2 | 1/2009 | Cromer et al. |
| 7,512,110 B2 | 3/2009 | Sayeedi et al. |
| 7,706,793 B2 | 4/2010 | Zhang |
| 7,742,498 B2 | 6/2010 | Barzegar et al. |
| 7,869,792 B1 | 1/2011 | Zhou et al. |
| 7,925,259 B2 | 4/2011 | Nylander et al. |
| 7,929,970 B1 | 4/2011 | Gunasekara et al. |
| 7,937,086 B2 | 5/2011 | Chen et al. |
| 8,032,153 B2 | 10/2011 | Karr et al. |
| 8,588,773 B2 | 11/2013 | Deshpande et al. |
| 8,737,229 B2 | 5/2014 | Khandekar et al. |
| 8,737,295 B2 | 5/2014 | Horn et al. |
| 8,848,656 B2 | 9/2014 | Horn et al. |
| 2002/0019231 A1 | 2/2002 | Palenius et al. |
| 2002/0168982 A1 | 11/2002 | Sorokine et al. |
| 2003/0008663 A1 | 1/2003 | Stein et al. |
| 2003/0016702 A1 | 1/2003 | Bender et al. |
| 2003/0051132 A1 | 3/2003 | Kobayashi et al. |
| 2003/0134642 A1 | 7/2003 | Kostic et al. |
| 2003/0220075 A1 | 11/2003 | Baker et al. |
| 2004/0009779 A1 | 1/2004 | Qu et al. |
| 2004/0082328 A1 | 4/2004 | Japenga et al. |
| 2004/0116110 A1 | 6/2004 | Amerga et al. |
| 2004/0136340 A1 | 7/2004 | Sanchez et al. |
| 2004/0198220 A1 | 10/2004 | Whelan et al. |
| 2004/0202131 A1 | 10/2004 | An et al. |
| 2005/0037798 A1 | 2/2005 | Yamashita et al. |
| 2005/0099998 A1 | 5/2005 | Semper |
| 2005/0202823 A1 | 9/2005 | Shaheen et al. |
| 2005/0245260 A1 | 11/2005 | Nielsen et al. |
| 2006/0025127 A1 | 2/2006 | Cromer et al. |
| 2006/0040700 A1 | 2/2006 | Roberts et al. |
| 2006/0148479 A1 | 7/2006 | Park et al. |
| 2006/0173976 A1 | 8/2006 | Vincent et al. |
| 2006/0184680 A1 | 8/2006 | Ruutu et al. |
| 2006/0189308 A1 | 8/2006 | Kurata et al. |
| 2006/0233150 A1 | 10/2006 | Cherian |
| 2006/0258354 A1 | 11/2006 | Ul Haq |
| 2006/0268746 A1 | 11/2006 | Wijting et al. |
| 2006/0268800 A1 | 11/2006 | Sugaya et al. |
| 2006/0276201 A1 | 12/2006 | Dupray et al. |
| 2007/0054666 A1 | 3/2007 | Choi |
| 2007/0097938 A1 | 5/2007 | Nylander et al. |
| 2007/0098053 A1 | 5/2007 | Rinne et al. |
| 2007/0104166 A1 | 5/2007 | Rahman et al. |
| 2007/0147286 A1 | 6/2007 | Laroia et al. |
| 2007/0211745 A1* | 9/2007 | Deshpande et al. .......... 370/432 |
| 2007/0232307 A1 | 10/2007 | Ibrahim et al. |
| 2007/0249291 A1 | 10/2007 | Nanda et al. |
| 2007/0250713 A1 | 10/2007 | Rahman et al. |
| 2007/0254596 A1* | 11/2007 | Corson et al. .................. 455/68 |
| 2008/0002692 A1* | 1/2008 | Meylan et al. ............... 370/390 |
| 2008/0004025 A1 | 1/2008 | Lee |
| 2008/0039099 A1 | 2/2008 | An et al. |
| 2008/0069065 A1 | 3/2008 | Wu et al. |
| 2008/0101301 A1 | 5/2008 | Thomas et al. |
| 2008/0132239 A1 | 6/2008 | Khetawat et al. |
| 2008/0192696 A1 | 8/2008 | Sachs et al. |
| 2008/0267114 A1 | 10/2008 | Mukherjee et al. |
| 2008/0287134 A1 | 11/2008 | Catovic et al. |
| 2008/0299975 A1 | 12/2008 | Sanchez et al. |
| 2008/0305801 A1 | 12/2008 | Burgess et al. |
| 2009/0047954 A1 | 2/2009 | Tenny et al. |
| 2009/0047955 A1 | 2/2009 | Frenger et al. |
| 2009/0047960 A1 | 2/2009 | Gunnarsson et al. |
| 2009/0047968 A1 | 2/2009 | Gunnarsson et al. |
| 2009/0052395 A1 | 2/2009 | Bao et al. |
| 2009/0086672 A1 | 4/2009 | Gholmieh et al. |
| 2009/0124284 A1 | 5/2009 | Scherzer et al. |
| 2009/0135784 A1 | 5/2009 | Horn et al. |
| 2009/0137228 A1 | 5/2009 | Horn et al. |
| 2009/0137249 A1 | 5/2009 | Horn et al. |
| 2009/0252113 A1 | 10/2009 | Take |
| 2009/0253432 A1 | 10/2009 | Willey et al. |
| 2009/0280819 A1 | 11/2009 | Brisebois et al. |
| 2009/0285113 A1 | 11/2009 | Yavuz et al. |
| 2010/0027510 A1 | 2/2010 | Balasubramanian et al. |
| 2010/0110945 A1 | 5/2010 | Koskela et al. |
| 2010/0184439 A1 | 7/2010 | Chen et al. |
| 2010/0227645 A1 | 9/2010 | Keevill et al. |
| 2010/0240367 A1 | 9/2010 | Lee et al. |
| 2010/0240368 A1 | 9/2010 | Fox et al. |
| 2010/0260139 A1* | 10/2010 | Backstrom ........ H04W 36/0083 370/331 |
| 2010/0323663 A1 | 12/2010 | Vikberg et al. |
| 2011/0263260 A1 | 10/2011 | Yavuz et al. |
| 2013/0065594 A1 | 3/2013 | Somasundaram et al. |
| 2014/0045495 A1 | 2/2014 | Deshpande et al. |

FOREIGN PATENT DOCUMENTS

| | | |
|---|---|---|
| CN | 1675956 A | 9/2005 |
| CN | 1701584 A | 11/2005 |
| CN | 1842210 A | 10/2006 |
| CN | 1964522 A | 5/2007 |
| CN | 101015221 A | 8/2007 |
| DE | 19510256 | 9/1995 |
| EP | 0589552 | 3/1994 |
| EP | 1670179 | 6/2006 |
| EP | 1699253 | 9/2006 |
| EP | 1717993 | 11/2006 |
| EP | 1775976 | 4/2007 |
| EP | 1835780 | 9/2007 |
| EP | 2077690 | 7/2009 |
| JP | 8501430 | 2/1996 |
| JP | 2003506960 A | 2/2003 |
| JP | 2003116162 A | 4/2003 |
| JP | 2004159304 A | 6/2004 |
| JP | 2004166273 A | 6/2004 |
| JP | 2004260824 A | 9/2004 |
| JP | 2006148836 A | 6/2006 |
| JP | 2007104417 A | 4/2007 |
| JP | 2007534227 A | 11/2007 |
| JP | 2009504050 A | 1/2009 |
| JP | 2009510973 A | 3/2009 |
| KR | 100711531 | 4/2007 |
| RU | 2145774 C1 | 2/2000 |

(56) References Cited

FOREIGN PATENT DOCUMENTS

| RU | 2199834 C2 | 2/2003 |
|---|---|---|
| RU | 2005129268 A | 3/2007 |
| WO | WO-9502309 A1 | 1/1995 |
| WO | WO-0133744 | 5/2001 |
| WO | WO-02080600 A1 | 10/2002 |
| WO | WO-02087275 A2 | 10/2002 |
| WO | WO-03009633 A1 | 1/2003 |
| WO | WO-2004019643 | 3/2004 |
| WO | WO-2004054310 | 6/2004 |
| WO | WO-2005065214 A2 | 7/2005 |
| WO | WO-2005122621 A1 | 12/2005 |
| WO | WO-2007015066 A2 | 2/2007 |
| WO | WO-2007015071 A2 | 2/2007 |
| WO | WO-2007040452 A1 | 4/2007 |
| WO | WO-2007040454 A2 | 4/2007 |
| WO | WO-2007075954 A2 | 7/2007 |
| WO | WO-2007080490 A1 | 7/2007 |
| WO | WO-2007096763 A2 | 8/2007 |
| WO | WO-2007097672 A1 | 8/2007 |
| WO | WO-2007097673 A1 | 8/2007 |
| WO | WO-2008030956 A2 | 3/2008 |
| WO | WO-2008124282 | 10/2008 |
| WO | WO-2009007720 A2 | 1/2009 |
| WO | WO-2009053710 A1 | 4/2009 |
| WO | WO-2009064931 | 5/2009 |
| WO | WO-2011050338 A1 | 4/2011 |

OTHER PUBLICATIONS

3GPP TR 24.801: "Pseudo-CR on Allowed CSG List update," 3GPP TSG CT WG1 meeting #55; C1-083427, v 1.1.1, Budapest, Hungary, Aug. 18-22, 2008.
3GPP TS 36.304 v8.0.0: "3rd Generation Partnership Project; Technical Specification Group Radio Access Network; Evolved Universal Terrestrial Radio Access (E-UTRA); User Equipment (UE) procedures in idle mode (Realease 8)," [Online] (Dec. 1, 2007), pp. 1-27, XP002524390.
ASUSTeK, "CSG related system information and CSG subscription information", 3GPP TSG-RAN WG2 #60, R2-075133, Nov. 9, 2007.
Asustek, "Mobility Information and Cell (re)selection, " Discussion & Decision, 3GPP TSG-RAN WG2 #60 Nov. 5-9, 2007, Jeju, Korea, R2-075135, pp. 1-8.
Ericsson, "Idle state access restriction for CSGs", 3GPP TSG-RAN WG2 #60, Tdoc R2074684, Nov. 9, 2007, <URL:http://www.3gpp.org/ftp/tsg_ran/WG2_RL2/TSGR2_60/Docs/R2-074684.zip>.
Ericsson: "Idle state access restriction for home eNB", R2-073415, 3GPP TSG-RAN WG2#59, Aug. 24, 2007.
ETSI TS 125.304 V7.1.0: "Universal Mobile Telecommunications System (UMTS); User Equipment (UE) procedures in idle mode and procedures for cell reselection in connected mode (3GPP TS 25.304 version 7.1.0 Release 7)" ETSI Standards, Sophia Antipolis Cedex, France, (Dec. 1, 2006), XP014039981.
"Evolved Universal Terrestrial Radio Access (E-UTRA) and Evolved Universal Terrestrial Radio Access (E-UTRAN); Overall description; Stage 2 (3GPP TS 36.300 version 8.4.0 Release 8); ETSI TS 136 300", ETSI Standards, LIS, Sophia Antipolis Cedex, France, vol. 3-R2, No. V8.4.0, Apr. 1, 2008, XP014041816, ISSN: 0000-0001 chapters: 10.1.1.2; 10.1.3; 10.1.3.2.
Huawei, "Detection of conflicting cell identities", 3GPP Draft; R2-074216, 3rd Generation Partnership Project (3GPP), Mobile Competence Centre ; 650, Route Des Lucioles ; F-06921 Sophia-Antipolis Cedex ; France, vol. RAN WG2, No. Shanghai, China; 20071002, Oct. 2, 2007, XP050136835, pp. 1-3, [retrieved on Oct. 2, 2007].

International Search Report and the Written Opinion—PCT/US2008/083467, International Search Authority—European Patent Office—Jan. 7, 2009.
Jung, Young-Ho et al: "PN offset Planning for Synchronous Cdma Based Fiber-Optic Microcellular Systems," Vehicular Technology Conference Proceedings, 2000. Internet Citation, (May 2000), pp. 2275-2279, XP002480275 [retrieved on May 15, 2000] paragraphs [0001]—[00V1], doi: 10.1109/VETECS.2000.851678.
NTT Docomo, et al., "Cell ID Assignment for Home Node B" 3GPP Draft; R2-073374 , 3rd Generation Partnership Project (3GPP), Mobile Competence Centre ; 650, Route Des Lucioles ; F-06921 Sophia-Antipolis Cedex ; France, Athens, Grece, vol. R2-073374, No. 59, Aug. 20, 2007, pp. 1-5,XP002541822 the whole document.
NTT Docomo, et al., "CSG with limited open access" 3GPP Draft; R2-075150 CSG With Limited Open Access, 3rd Generation Partnership Project (3GPP), Mobile Competence Centre ; 650, Route Des Lucioles ; F-06921 Sophia-Antipolis Cedex ; France, vol. Ran WG2, No. Jeju; 20071112, Nov. 12, 2007, XP050137597 [retrieved on Nov. 12, 2007] the whole document.
Panasonic, "CSG Cell Prioritization by UE", 3GPP TSG RAN WG2 #59 R2-073282, Aug. 20, 2007.
QUALCOMM Europe: "Implicit Priority for CSG cells," 3GPP TSG-RAN WG2 #63bis, R2-086586, (Nov. 10, 2008), XP002557108.
QUALCOMM Europe: "Linger timer for HeNB reselection to improve standby time of UE in mobility situations," 3GPP Draft TSG-RAN WG2 meeting #63; R2-084155, 3rd Generation Partnership Project (3GPP), Jeju, Korea; (Aug. 12, 2008), XP050319291.
QUALCOMM Europe: "Linger Timer for HNB Cell Reselection," 3GPP Draft TSG-RAN WG2 meeting #63; R2-084342, 3rd Generation Partnership Project (3GPP), Jeju, Korea, (Aug. 22, 2008), XP050319418.
QUALCOMM Europe: "Parameter for HNB White List Cell Selection," 3GPP Draft TSG-RAN WG2 meeting #63; R2-084552, 3rd Generation Partnership Project (3GPP), Jeju, Korea (Aug. 18, 2008), XP050319589.
QUALCOMM Europe: "UTRA HNB Idle Mode (Re)selection," 3GPP Draft TSG-RAN WG2 #62bis, R2-084347, 3rd Generation Partnership Project (3GPP), Jeju, Korea, Aug. 2008, XP050319423, pp. 1-4.
Rapporteur (Huawei): "Email report on Home-(e)NB mobility, main issues [63_LTE_C01,]" 3GPP Draft TSG-RAN2 Meeting #63bis; R2-085705, 3rd Generation Partnership Project (3GPP), Prague, Czech Republic; (Oct. 1, 2008), XP050320478.
Taiwan Search Report—TW097144274—TIPO—Jan. 15, 2012.
Taiwan Search Report—TW097144274—TIPO—Aug. 28, 2012.
T-Mobile, Report on email discussion "Home Cells (1)—General concepts & solutions for LTE", 3GPP TSG RAN2#60 R2-074904, Nov. 5, 2007.
TSG RAN WG2, "LS on Closed Subscriber Groups for LTE Home cells", 3GPP TSG-RAN WG2#58bis R2-072991, Release 8, Jun. 25, 2007.
Vodafone, "GERAN to LTE Handover: Home Cell Deployment Considerations", 3GPP Workshop GERAN/RAN, TDoc GR-070020, Sep. 28, 2007.
Vodafone Group: "Signalling on a CSG Cell" 3GPP Draft; R2-072831, 3rd Generation Partnership Project (3GPP), Mobile Competence Centre ; 650, Route Des Lucioles ; F-06921 Sophia-Antipolis Cedex ; France, vol. RAN WG2, No. Orlando, USA; 20070702, Jul. 2, 2007, XP050135608.
Nokia Corporation, "Simple CSG for REL8," 3GPP TSG-RAN WG2 Meeting #61bis R2-081735, Nokia Siemens Networks, Apr. 4, 2008, pp. 1-5.

* cited by examiner

UTILIZING BROADCAST SIGNALS TO CONVEY RESTRICTED ASSOCIATION INFORMATION

CROSS-REFERENCE TO RELATED APPLICATIONS

This application is a divisional application of U.S. patent application Ser. No. 12/269,637, entitled "UTILIZING BROADCAST SIGNALS TO CONVEY RESTRICTED ASSOCIATION INFORMATION," which was filed Nov. 12, 2008, and claims the benefit of U.S. Provisional Patent application Ser. No. 60/988,631 entitled "APPARATUS AND METHOD TO FACILITATE IDLE STATE HANDOFF IN SYSTEMS WITH RESTRICTED ASSOCIATION" which was filed Nov. 16, 2007, U.S. Provisional Patent application Ser. No. 60/988,641 entitled "APPARATUS AND METHOD TO FACILITATE CONNECTED STATE HANDOFF IN SYSTEMS WITH RESTRICTED ASSOCIATION" which was filed Nov. 16, 2007, U.S. Provisional Patent application Ser. No. 60/988,649 entitled "APPARATUS AND METHOD TO FACILITATE MANAGEMENT AND ADVERTISEMENT OF NEIGHBOR LISTS IN SYSTEMS WITH RESTRICTED ASSOCIATION" which was filed Nov. 16, 2007, and U.S. Provisional Patent application Ser. No. 61/025,093 entitled "SYSTEMS AND METHODS FOR SIGNALING RESTRICTED ASSOCIATION" which was filed Jan. 31, 2008. The entireties of the aforementioned applications are herein incorporated by reference.

In addition, this application is related to co-pending U.S. patent applications "UTILIZING RESTRICTION CODES IN WIRELESS ACCESS POINT CONNECTION ATTEMPTS" by Gavin Horn, et al., U.S. patent application Ser. No. 12/269,611, "FAVORING ACCESS POINTS IN WIRELESS COMMUNICATIONS" by Gavin Horn, et al., U.S. patent application Ser. No. 12/269,619, "CLASSIFYING ACCESS POINTS USING PILOT IDENTIFIERS" by Gavin Horn, et al., U.S. patent application Ser. No. 12/269,642, and "SECTOR IDENTIFICATION USING SECTOR PARAMETERS SIGNATURES" by Gavin Horn, et al., U.S. patent application Ser. No. 12/269,654, all of which are filed concurrently herewith, assigned to the assignee hereof, and expressly incorporated by reference herein.

BACKGROUND

I. Field

The following description relates generally to wireless communications, and more particularly to utilizing broadcast signals to transmit restricted association data in a wireless communication network.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. As mobile devices move throughout service areas, cells utilized for communication by the devices can be reselected between one or more access points (e.g., macrocells, femtocells, etc.). This can occur, for example, where an available access point, or serving cell thereof, can offer a better signal or service than a current access point. The mobile devices can measure parameters related to one or more cells, such as signal quality, service level, etc. and rank the cells according to desirability, which can be based on one or more of the parameters. In one example, the available access point can relate to a home access point for a given mobile device offering desirable billing, coverage, service options, etc. Accordingly, cells utilized for communication can be reselected to the more desirable access point when within a specified range.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating indicating restricted association information using broadcast signals in wireless communication networks. For example, a mobile device can receive the restricted association information via broadcast signal from an access point and can utilize the information in determining to perform cell reselection to the access point or otherwise. The access point can generate broadcast signals comprising one or more indicators/identifiers, which can relate to a class of the access point (e.g., femtocell, macrocell base station, etc.), a group to which the access point is associated (which can be based on a provider of the access point, a location of the access point, etc.), a restricted association indicator, a sector identifier, and/or the like. Mobile devices can receive the indicators/identifiers and use such to identify aspects of the access point in determining whether to reselect one or more cells related to the access point, for example.

According to related aspects, a method for determining cell information for reselection in a wireless communication network is provided. The method includes determining a restricted association indicator from a broadcast signal received from an access point. The method further includes obtaining a group identifier related to the access point from the broadcast signal based at least in part on the restricted association indicator and establishing communication with the access point based at least in part on determining the group identifier as present in a list of accessible group identifiers.

Another aspect relates to a wireless communications apparatus. The wireless communications apparatus can include at least one processor configured to receive a broadcast signal from an access point and determine a restricted association indicator from the broadcast signal. The processor is further configured to receive an identification of a group related to the access point from the broadcast signal based at least in part on the restricted association indicator. Moreover, the processor is further configured to communicate with the access point based at least in part on determining the identification as present in a list of preferred access point groups. The wireless communications apparatus also comprises a memory coupled to the at least one processor.

Yet another aspect relates to a wireless communications apparatus that facilitates communicating with an access point in a wireless network. The wireless communications apparatus can comprise means for determining a restricted association indicator from a broadcast signal received from an access point and means for determining an identification of a group related to the access point from the broadcast signal based at least in part on the restricted association indicator. The wireless communications apparatus can additionally include means for communicating with the access point based at least in part on the identification of the group.

Still another aspect relates to a computer program product, which can have a computer-readable medium including code for causing at least one computer to determine a restricted association indicator from a broadcast signal received from an access point. The computer-readable medium can also comprise code for causing the at least one computer to obtain a group identifier related to the access point from the broadcast signal based at least in part on the restricted association indicator. Moreover, the computer-readable medium can comprise code for causing the at least one computer to establish communication with the access point based at least in part on determining the group identifier as present in a list of accessible group identifiers.

Moreover, an additional aspect relates to an apparatus. The apparatus can include a restricted association indicator identifier that determines a restricted association indicator from a broadcast signal received from an access point and an access point identifier determiner that obtains an access point group identification related to the access point from the broadcast signal based at least in part on the restricted association indicator. The apparatus can further include a cell reselector that establishes communication with the access point based at least in part on determining the identification as present in a list of preferred access point groups.

According to additional aspects, a method for specifying access point information in broadcasts signals transmitted over a wireless communication network is provided. The method can include determining an access point type and generating a broadcast signal that identifies the access point based at least in part on the access point type. The method further includes transmitting the broadcast signal repeatedly over the wireless network according to the access point type.

Another aspect relates to a wireless communications apparatus. The wireless communications apparatus can include at least one processor configured to receive a type of the wireless communications apparatus and generate a broadcast signal that identifies the wireless communications apparatus based at least in part on the type. The processor is further configured to transmit the broadcast signal repeatedly over a wireless network to identify the type. The wireless communications apparatus also comprises a memory coupled to the at least one processor.

Yet another aspect relates to a wireless communications apparatus that facilitates indicating restricted association in wireless communications. The wireless communications apparatus can comprise means for receiving a type of the wireless communications apparatus and means for generating a broadcast signal that identifies the wireless communications apparatus based at least in part on the type. The wireless communications apparatus can additionally include means for transmitting the broadcast signal repeatedly over a wireless network according to the type.

Still another aspect relates to a computer program product, which can have a computer-readable medium including code for causing at least one computer to determine an access point type. The computer-readable medium can also comprise code for causing the at least one computer to generate a broadcast signal that identifies the access point based at least in part on the access point type. Moreover, the computer-readable medium can comprise code for causing the at least one computer to transmit the broadcast signal repeatedly over the wireless network according to the access point type.

Moreover, an additional aspect relates to an apparatus. The apparatus can include a restricted association specifier that specifies a restricted association indicator related to a determined type of the apparatus. The apparatus can further include a broadcast signal generator that creates a broadcast signal based at least in part on the restricted association indicator and a transmitter that repeatedly transmits the broadcast signal over the wireless network according to the restricted association indicator.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
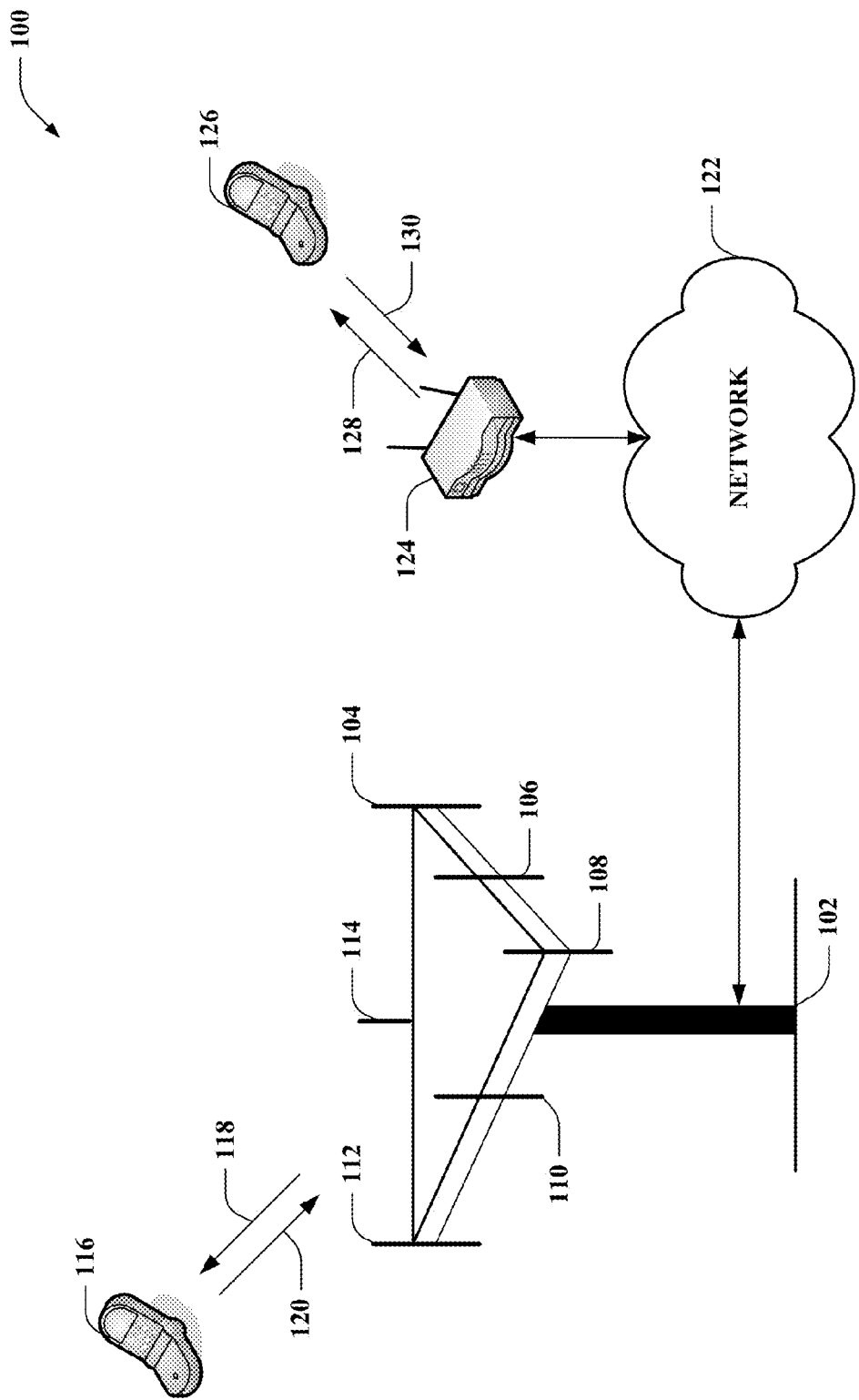
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., a 3G network), over a backhaul link connection. The network 122 can store information regarding access parameters related to the mobile device 116 and 126 and other parameters of a wireless access network to provide service to the devices 116 an 126. Furthermore, a femtocell 124 can be provided to facilitate communicating with the mobile device 126 over forward link 128 and reverse link 130 (similarly to forward link 118 and reverse link 120, as described supra). The femtocell 124 can provide access to one or more mobile devices 126 much like the base station 102, but on a smaller scale. In one example, femtocell 124 can be configured in a residence, business, and/or other close range setting (e.g., theme park, stadium, apartment complex, etc.). The femtocell 124 can connect to the network 122 utilizing a backhaul link connection, which can be over a broadband Internet connection (T1/T3, digital subscriber line (DSL), cable, etc.), in one example. The network 122 can similarly provide access information for the mobile device 126.

According to an example, mobile devices 116 and 126 can travel over service areas performing cell reselection among disparate base stations and/or femtocells during travel. In this regard, the mobile devices 116 and 126 can effectuate continuous wireless service seamless to users of the mobile devices 116 and 126. In one example (not shown), mobile device 126 can have been communicating with the base station 102 similarly to the mobile device 116, and can have moved into a specified range of the femtocell 124. In this regard, the mobile device 126 can have reselected one or more cells related to the femtocell 124 to receive more desirable wireless service access. In one example, the femtocell 124 can be a home access point for the mobile device 126 offering more desirable billing and/or other access options. In another example, the femtocell 124 can be related to a business or venue offering options or data tailored to the respective business or venue. Thus, mobile device 126 can reselect one or more cells related to the femtocell 124, in an idle and/or connected mode, to receive such tailored options. In addition, as mobile device 126 moves toward base station 102, it can reselect a cell related thereto, for a variety of reasons (e.g., to mitigate interference on the femtocell 124, to receive a more optimal signal or increased throughput, etc.).

In traveling over the service area, mobile devices 116 and/or 126 can continually measure available base stations (such as base station 102), femtocells (such as femtocell 124), and/or other access points, to determine when cell reselection is beneficial to the mobile devices 116 and/or 126. The measuring can include, for example, evaluating signal quality, throughput, services available, a wireless access provider related to the access point, and/or the like. Based on one or more of the measurements, the mobile devices 116 and/or 126 can rank access points for reselection. Upon determining the ranking, the mobile devices 116 and/or 126 can attempt cell reselection with the highest ranking access point. In addition, the mobile devices 116 and/or 126 can maintain a list of accessible access points and/or groups of accessible access points. The accessible access points can relate to, for example, restricted association access points that the mobile devices 116 and/or 126 are authorized to access and/or to which access is preferred or otherwise favorable over other access points.

In one example, the femtocell 124 can be such a restricted association access point. Restricted association access points, for example, can be restricted in some aspects where each access point provides certain services to certain mobile devices (e.g., mobile devices 116 and/or 126) but not necessarily to other mobile devices or access terminals (not shown). For example, the femtocell 124 can be restricted to not provide to the other mobile devices or access terminals registration, signaling, voice call, data access, and/or additional services. Restricted association access points can be deployed in an ad-hoc manner. For example, a given homeowner can install and configure a restricted access point for the home.

In one example, the mobile devices 116 and/or 126 can identify one or more available access points based at least in part on one or more indicators in a broadcast signal related to the access point(s). Upon receiving the one or more indicators, the mobile devices 116 and/or 126 can ensure the access point(s) is/are in the list, or that a related group identifier is in the list, before attempting cell reselection. In another example, the mobile devices 116 and/or 126 can verify association of the access point with the list before measuring the parameters for ranking.

In one example, the base station 102 and/or femtocell 124 can transmit broadcast signals, which can be received by one or more mobile devices 116 and/or 126. The broadcast signals can be beacon signals utilized to identify presence and/or signal strength of a sector for communication, pilot signals utilized to determine initial communication parameters for receiving subsequent signals, and/or the like. In addition, the broadcast signals can include a restricted association indicator, an access point identifier, a group identifier related to a group of access points (e.g., access points of common service providers, access points related to a corporation or community, etc.), a sector identifier, a type identifier, and/or additional indicators. The restricted association indicator can indicate, for example, whether access to the base station 102 and/or femtocell 124 is restricted to certain mobile devices and/or groups thereof. For example, the access point can relate to a corporation where mobile devices owned by the corporation or employees thereof can utilize the access point. Additionally, the restricted association indicator can indicate a level of restricted association; the access point can restrict all access and/or signaling access, data access, registration access, service access, and/or the like. Upon receiving the broadcast signal, one or more mobile devices 116 and/or 126 can detect a restricted association indicator. It is to be appreciated that this can be a value, such as a Boolean variable, an enumeration of values, a text identifier, and/or the like, where a presence or absence of the indicator and/or certain values thereof can be detected.

Where the indicator is present in the broadcast signal or of a given value such as to indicate that the base station 102 and/or femtocell 124 implements restricted association, the mobile devices 116 and/or 126 can additionally evaluate an access point and/or group identifier and compare the identifier to a list of accessible identifiers, for example. Each access point, such as base station 102 and/or femtocell 124, can include an identifier in the broadcast signal, in one example. The identifier can be compared to a maintained list of accessible access point and/or group identifiers to ensure it is in the list. If so, communication can be requested and/or established with the base station 102 and/or femtocell 124; this can be part of cell reselection, in one example. It is to be appreciated that where the restricted association indicator is false or absent from the broadcast signal, an identifier need not necessarily be evaluated or present since access to the base station 102 and/or femtocell 124 is not restricted. Moreover, a sector identifier can be evaluated to determine whether the access point implements restricted association, in one example. In addition, for instance, the indicator and/or access point or group identifier can be indicated by one or more extrinsic aspects of the broadcast signal, such as a transmission time, interval, size, periodicity, frequency utilized, and/or the like. The mobile devices 116 and/or 126 can evaluate one or more of the extrinsic aspects, in this example, to determine the indicators and/or identifiers.

Figure 2:
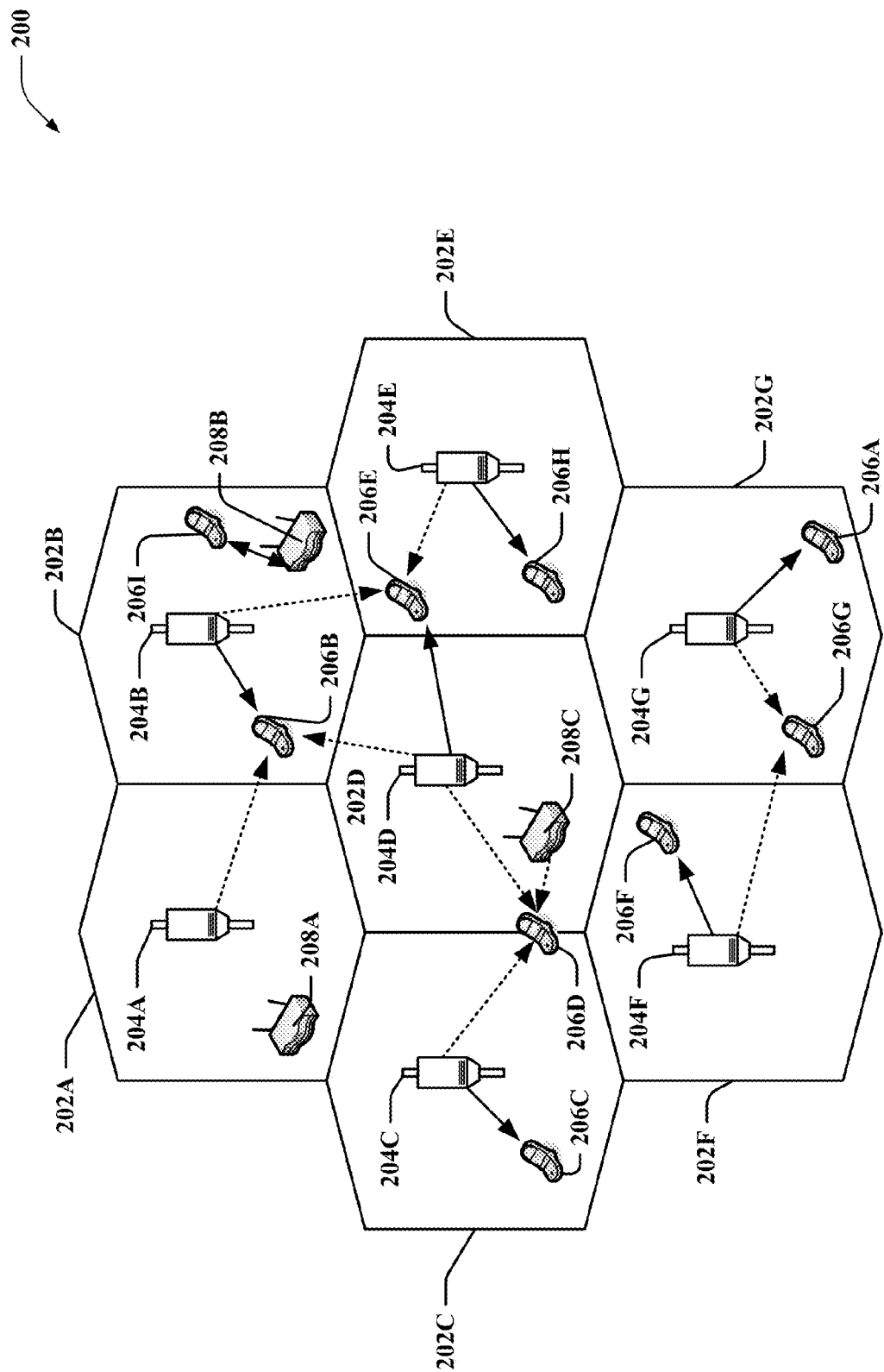
FIG. 2 is an illustration of a wireless communication network that facilitates cell reselection.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208C are shown. These can be smaller scale access points, such as femtocells, offering services related to a particular service location, as described. The mobile devices 206A-206I can additionally communicate with these smaller scale access points 208A-208C to receive offered services. The wireless communication system 200 can provide service over a large geographic region, in one example (e.g., macrocells 202A-202G can cover a few blocks in a neighborhood, and the femtocell access points 208A-208C can be present in areas such as residences, office buildings, and/or the like as described). In an example, the mobile devices 206A-206I can establish connection with the access points 204A-204G and/or 208A-208C over the air and/or over a backhaul connection.

Additionally, as shown, the mobile devices 206A-206I can travel throughout the system 200 and can reselect cells related to the various access points 204A-204G and/or 208A-208C as it moves through the different macrocells 202A-202G or femtocell coverage areas. In one example, the one or more of the mobile devices 206A-206I can be associated with a home femtocell related to at least one of femtocell access points 208A-208C. For example, mobile device 206I can be associated with femtocell access point 208B as its home femtocell. Thus, though mobile device 206I is in macrocell 202B, and thus in coverage area of access point 204B, it can communicate with the femtocell access point 208B instead of (or in addition to) access point 204B. In one example, the femtocell access point 208B can provide additional services to the mobile device 206I, such as desirable billing or charges, minute usage, enhanced services (e.g., faster broadband access, media services, etc.). Thus, when the mobile device 206I is in range of the femtocell access point 208B, it can be reined in to communicate therewith by favoring the femtocell access point 208B in reselection.

For example, mobile device 206D can be associated with femtocell access point 208C. As the mobile device 206D moves from macrocell 202C into 202D and closer to access points 204D and/or 208C, it can begin the cell reselection process, as described herein. This can include, for example, measuring surrounding cell parameters (e.g., related to access points 204C, 204D, and 208C) to determine a desirable connection. The parameters can relate to, for example, signal quality, connection throughput, services offered, a service provider related to the access point, and/or the like. The mobile device 206D can additionally verify an identifier of the access point as present in a list of accessible access points, as described. The list can additionally or alternatively identify groups of access points where a group identifier of the access point can be verified with group identifiers in the list. In the foregoing example, the mobile device 206D can measure parameters for access points 204C, 204D, and 208C and rank the cells to determine whether to perform cell reselection from access point 204C to one of the others if their rank is higher. As in the previous example, where femtocell access point 208C relates to a home femtocell of the mobile device 206D, it can favor it for reselection (e.g., by evaluating an added parameter offset to increase its value and/or hysteresis to decrease parameter values of other access points, for example). If one or more of the disparate access points 204D and/or 208C rank higher than the access point 204C, mobile device 206D can reselect one or more cells related to the disparate access point 204D or 208C whether in an idle or connected mode.

In one example, one or more of the disparate access points 204D and/or 208C can implement restricted association where some mobile devices cannot connect thereto, and/or the access points 204D and/or 208C can restrict certain mobile devices with respect to providing signaling, data access, registration, service, and/or the like. This can be based at least in part on a service provider of the mobile device and the restricted associated access point, for example. In another example, the restricted association access point can relate to certain mobile devices, such as a corporate access point restricting access only to corporate issued mobile devices. Thus, if the mobile device 206D cannot reselect cells related to one or more of the disparate access points 204D and/or 208C due to restricted association, it can attempt cell reselection with one or more of the other ranked access points until it finds an access point to which it can connect. Where the mobile device 206D cannot connect to access point 204D and/or 208C due to restricted association, it can receive a restriction code indicating the reason for the restriction.

Furthermore, as described, the mobile devices 206A-206I can maintain a list of accessible access points and/or groups thereof. In one example, the list can include only certain types of access points (such as femtocells) since other types of access points (such as macrocells) can be accessible from substantially any mobile device. The list of accessible access points and/or groups can be originally populated, for example, by one or more access points in communication with the mobile device 206A-206I, which can retrieve the information from an underlying wireless network as described. As the mobile devices 206A-206I move throughout the coverage area of the wireless system 200 and reselects cells as described, it can first verify the cells as being present in the list where relevant. In one example, if the mobile devices 206A-206I determine one or more femtocell access points 208A-208C to be the highest ranked cell based on measurements as described, it can verify that the respective femtocell access point is in the list. If not, the mobile devices 206A-206I can decide not to attempt access to the femtocell access point and can attempt connection with the next highest ranked access point and/or attempt to locate another access point on a disparate frequency.

As described above, the access points 204A-204G and/or 208A-208C, can transmit broadcast signals that can be utilized to indicate presence of the access point and/or related sector, specify initial communication parameters, and/or the like. In addition, the broadcast signals can indicate whether the access points 204A-204G and/or 208A-208C implement restricted association and/or a related identifier for the access point and/or a corresponding access point group, as described. The broadcast signals can additionally identify a related sector, type of access point, etc., in an example. The mobile devices 206A-206I can utilize this information to determine if a highly ranked access point implements restricted association, and if so, whether that access point is in the maintained list of accessible access points. If in the list, the mobile device(s) can request connection establishment and/or establish a connection with the access point as described above. It is to be appreciated, as described, that extrinsic aspects of the broadcast signal can be utilized to indicate and determine the specified restricted association information; the extrinsic aspects can include broadcast signal type, duration, periodicity, interval, length, frequency, and/or the like.

Figure 3:
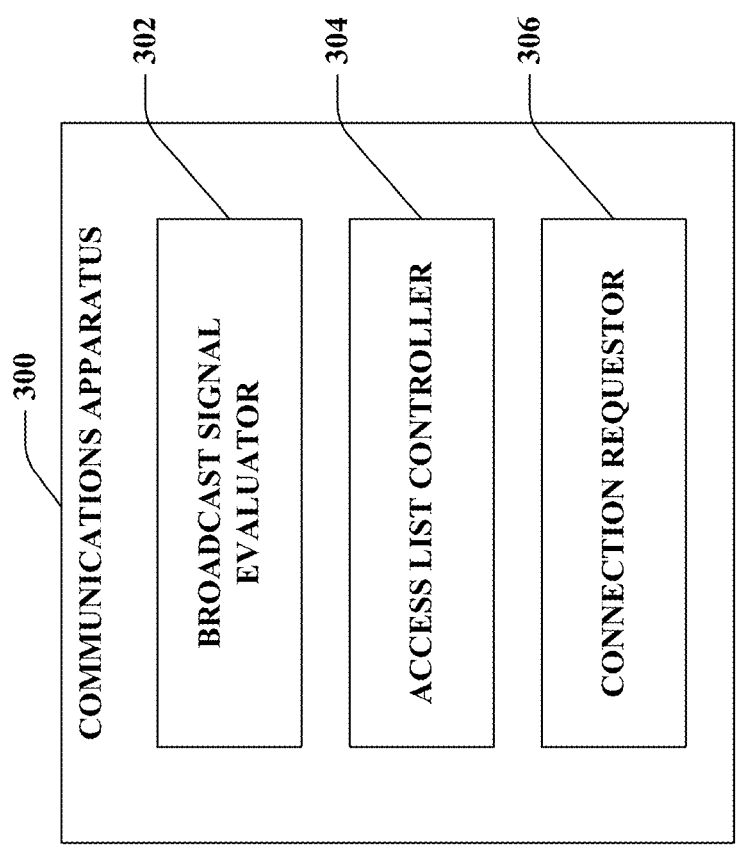
FIG. 3 is an illustration of an example communications apparatus for employment within a wireless communications environment.

Turning to FIG. 3, illustrated is a communications apparatus 300 for employment within a wireless communications environment. The communications apparatus 300 can be a base station or a portion thereof, a mobile device or a portion thereof, or substantially any communications apparatus that receives data transmitted in a wireless communications environment. The communications apparatus 300 can include a broadcast signal evaluator 302 that analyzes one or more broadcast signals to determine restricted association parameters associated with an access point (not shown) transmitting the signals, an access list controller 304 that maintains a list of accessible access points to which connection can be established, and a connection requestor 306 that requests and/or establishes a connection with one or more of the access points. In one example, the connection requestor 306 can request and/or establish an initial connection; additionally, however, the connection requestor 306 can also request the connection during cell reselection.

According to an example, the broadcast signal evaluator 302 can analyze one or more broadcast signals transmitted by one or more access points to determine an access point to which to connect for receiving wireless communication services. For example, the broadcast signal evaluator 302 can determine one or more intrinsic and/or extrinsic aspects of the signal that can be indicative of one or more indicators and/or identifiers related to restricted association of an associated access point. In one example, a restricted association indicator can be included in the broadcast signal (e.g., as one or more parameters) such that the broadcast signal evaluator 302 can determine whether the associated access point implements restricted association based at least in part on the included indicator. It is to be appreciated that such an indication of restricted association can be determined based at least in part on a signal type, duration, periodicity, interval, frequency, etc., as described.

If the broadcast signal evaluator 302 determines that the access point implements restricted association, the broadcast signal evaluator 302 can further determine an access point identifier and/or an identifier related to a group of access points present in the signal or identified by the extrinsic aspects as described. The identifier can be text-based, of a primitive type, an enumeration, and/or the like, for example. The access list controller 304 can verify existence of the determined access point identifier and/or group identifier in a maintained list of accessible access points and/or groups. If the identifier is in the list, the connection requestor 306 can request connection with the access point. It is to be appreciated that the access list controller 304 can additionally or alternatively maintain a list of access point and/or associated groups to which connection is prohibited; in this case, the access list controller 304 verifies that the access point and/or group identifier is not in the list. If a restricted association indicator is not present within the broadcast signal, as determined by the broadcast signal evaluator 302, the connection requestor 306 can request connection with the access point since the access point does not implement restricted association. Thus, an access point and/or group identifier can be read only when needed to conserve resources of the communications apparatus 300, in one example.

The connection requestor 306 can additionally request connection based at least in part on the broadcast signal during cell reselection, as described supra. This can occur in an idle and/or connected mode of the communications apparatus 300, in one example. In addition, a sector identifier can be determined from intrinsic and/or extrinsic aspects of the broadcast signal, as described, by the broadcast signal evaluator 302. Based on the sector identifier, for example, the broadcast signal evaluator can determine a type and/or restricted association aspect of a related access point. Thus, in this example, an explicit restricted association indicator need not be received or analyzed. In one example, the access list controller 304 caches the restricted association information of an access point based on the sector identifier of the access point, and does not need to receive an explicit restricted association indicator. Moreover, for example, the sector identifier can be unique and/or within a certain range such that the access list controller 304 can associate the identifier as a restricted association access point or otherwise. As described, if the sector identifier is determined as relating to a restricted association access point, an access point or group identifier can be determined from the broadcast signal, and the access list controller 304 can determine that access is allowed to the restricted association access point, as described. Moreover, the restricted association indicator, whether derived from extrinsic or intrinsic information by the broadcast signal evaluator 302, can indicate restricted association with respect to signaling, data access, registration, and service, and/or the like.

Figure 4:
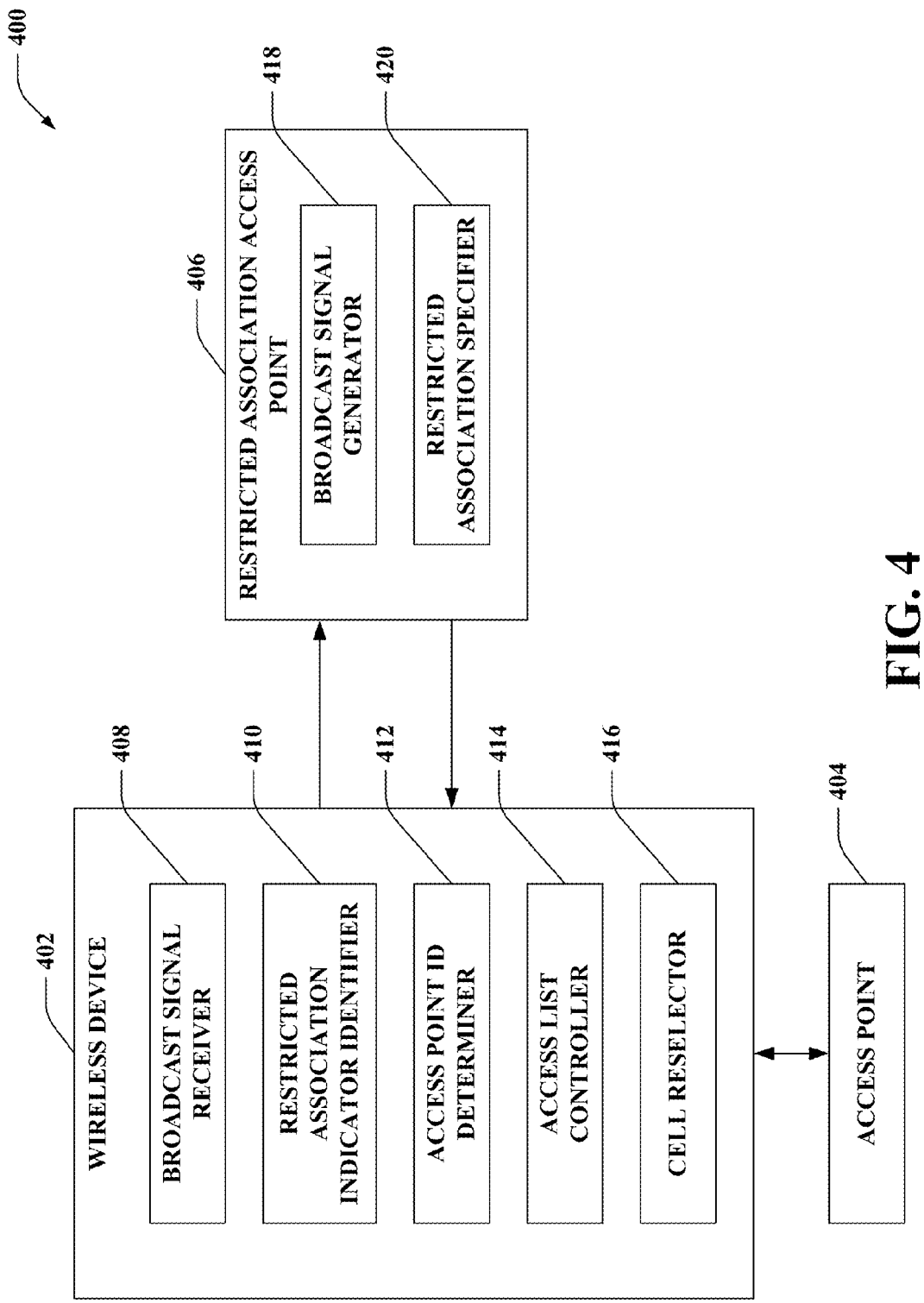
FIG. 4 is an illustration of an example wireless communications system that effectuates utilizing broadcast signals to indicate restricted association information.

Now referring to FIG. 4, illustrated is a wireless communications system 400 that facilitates indicating restricted association information within broadcast signals. The wireless device 402, access point 404, and/or restricted association access point 406 can be a base station, femtocell, mobile device, or portion thereof. In one example, wireless device 402 can transmit information to an access point 404 and/or restricted association access point 406 over a reverse link or uplink channel; further wireless device 402 can receive information from access point 404 or restricted association access point 406 over a forward link or downlink channel. Moreover, system 400 can be a MIMO system. Also, the components and functionalities shown and described below in the wireless device 402 can be present in the access point 404 and/or restricted association access point 406 as well and vice versa, in one example; the configuration depicted excludes these components for ease of explanation.

Wireless device 402 includes a broadcast signal receiver 408 that can receive one or more broadcast signals transmitted from one or more access points, such as access point 404 and restricted association access point 406, a restricted association indicator identifier 410 that can determine a restricted association indication related to the access point based at least in part on the broadcast signal, an access point identifier determiner 412 that can obtain an access point and/or group identifier based on the broadcast signal, an access list controller 414 that can maintain a list of accessible access points and/or groups of access points, and a cell reselector 416 that can reselect one or more cells related to access points 404 and 406 as described previously. In one example, the cell reselector 416 can additionally perform cell measurement, ranking, and reselection, as described.

The restricted association access point 406 can comprise a broadcast signal generator 418 that can create a signal, which can be broadcast such that a number of mobile devices can receive the signal (e.g., as a beacon or pilot signal), and a restricted association specifier 420 that can integrate one or more restricted association indicators and/or identifiers in the broadcast signal. In one example, the restricted association specifier 420 can specify the restricted association indicators and/or identifiers as one or more parameters in a portion of the broadcast signal. Additionally or alternatively, the restricted association specifier 420 can modify one or more parameters related to transmission of the broadcast signal to indicate the indicators and/or identifiers, such as a frequency utilized, one or more subcarriers or combination thereof, duration, interval, periodicity, and/or the like. Moreover, a combination of the foregoing examples can be utilized to convey the restricted association information.

According to an example, the broadcast signal generator 418 can create a broadcast signal for transmission that identifies one or more aspects of the restricted association access point 406. In one example, the broadcast signal can be a beacon signal that allows devices to detect presence of the restricted association access point 406. In another example, the broadcast signal can be a pilot signal that allows mobile devices to determine timing and other parameters to facilitate subsequent communication with the restricted association access point 406. The broadcast signal can comprise, for example, identification information such as a sector identifier, in one example. The restricted association specifier 420 can include additional information using the broadcast signal. For example, an access point type identifier, a restricted association identifier, an access point identifier, an identifier related to a group of related access points, and/or other information can be included as parameters of the broadcast signal. In another example, the foregoing can be indicated by affecting one or more aspects of the broadcast signal as described (e.g., duration, periodicity, frequency, utilized subcarriers, interval, etc.). The restricted association access point 406 can accordingly transmit the broadcast signal.

Additionally, the wireless device 402 can be communicating with the access point 404 to receive wireless communication services. The cell reselector 416 can continually monitor surrounding cells determining measurements related thereto and can rank cells for reselection, as described. In one example, the restricted association access point 406 can rank highly; this can be because the restricted association access point 406 is a home access point for the wireless device 402, is of a threshold signal strength, has determined favorable services, and/or the like as described previously. In this regard, the broadcast signal receiver 408 can receive the broadcast signal transmitted by the restricted association access point identifier 406 once the cell reselector determines to measure parameters associated therewith.

Upon receiving the broadcast signal, the restricted association indicator identifier 410 can be utilized to determine a restricted association indicator from the signal. In one example, this can be an explicit parameter and/or based on extrinsic aspects of the signal, as described. In another example, the restricted association indicator identifier 410 can determine the indication based at least in part on a sector identifier. For example, the sector identifier can be associated with such an indication by being within a range specified for restricted association access points. In addition, upon initially establishing or being denied establishment with the restricted association access point 406, the wireless device 402 can store the sector identifier and utilize such in requesting or not requesting subsequent communication establishment.

If the restricted association indicator identifier 410 determines that the restricted association access point 406 implements restricted association, the access point identifier determiner 412 can be utilized to determine an access point identifier, and/or a related group identifier, from the broadcast signal. The determined identifier can be compared with a list of accessible access points and/or groups maintained by the access list controller 414. If the identifier is in the list, the cell reselector 416 can request connection establishment from the restricted association access point as described. If not, the cell reselector 416 can move to the next cell in the list, and associated broadcast signals can be received by the broadcast signal receiver 408, in one example. In addition, it is to be appreciated that the wireless device can initially establish connection with the restricted association access point 406 based at least in part on the determined restricted association information. As described, the restricted association indicator can be a Boolean indicator, in one example; however, it is to be appreciated that the indicator can also be a multi-value variable that specifies restriction as to signaling, data access, registration, service, and/or the like, in one example. In addition, the access point and/or group identifier can be text based, of a primitive type, an enumeration, data structure, and/or the like, as mentioned.

Figure 5:
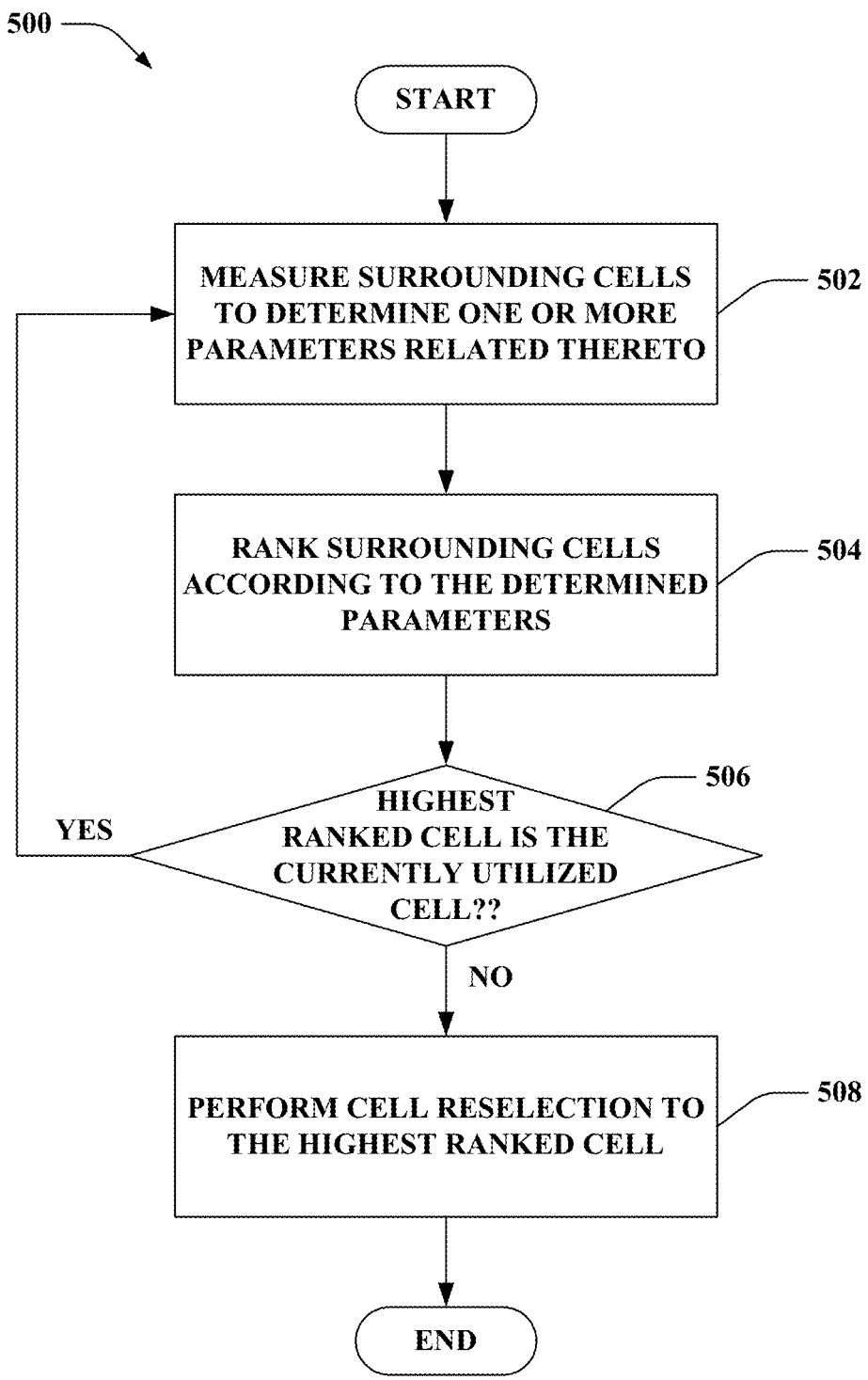
FIG. 5 is an illustration of an example methodology that facilitates performing cell reselection in wireless networks.
Figure 6:
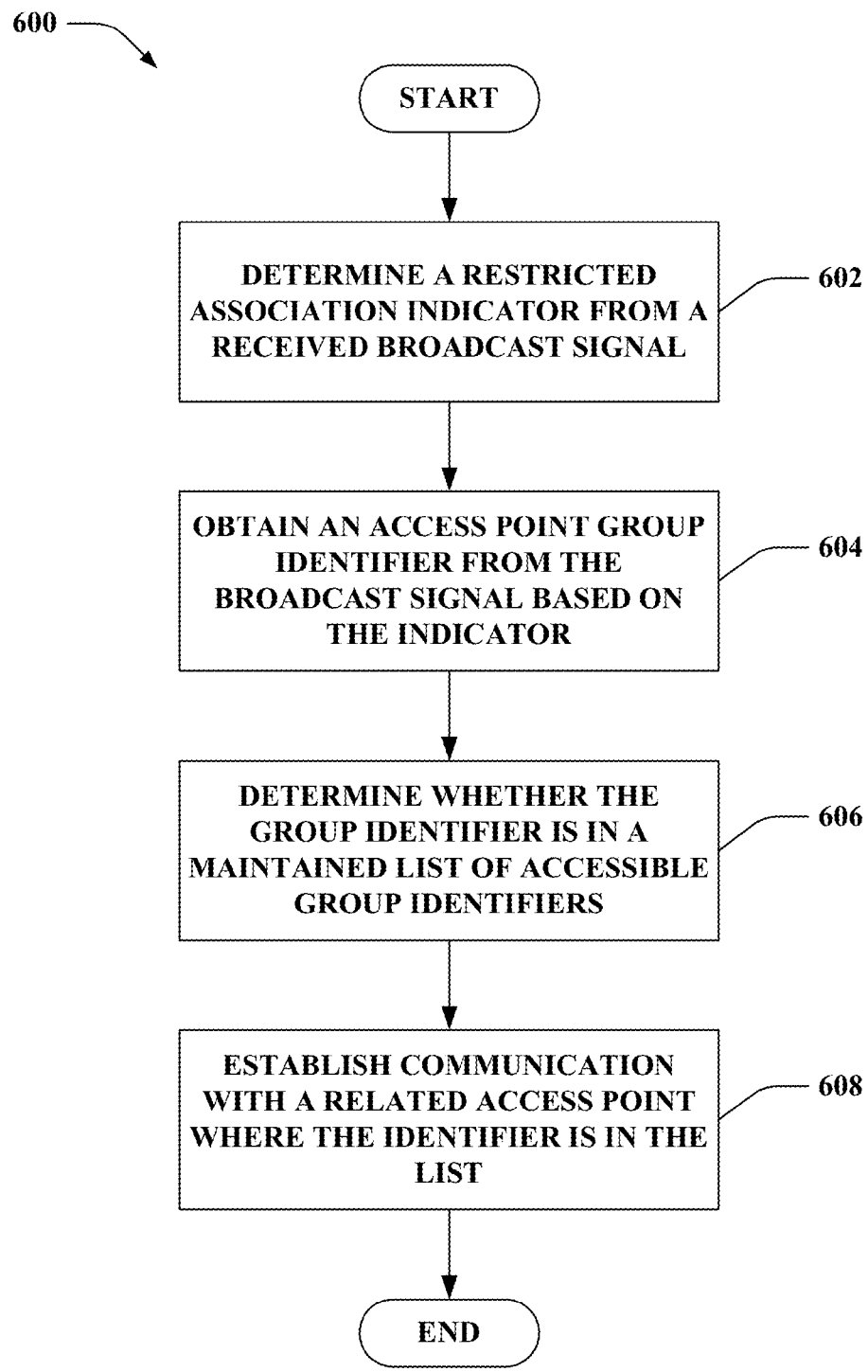
FIG. 6 is an illustration of an example methodology that facilitates evaluating broadcast signals to determine restricted association or access point type information.
Figure 7:
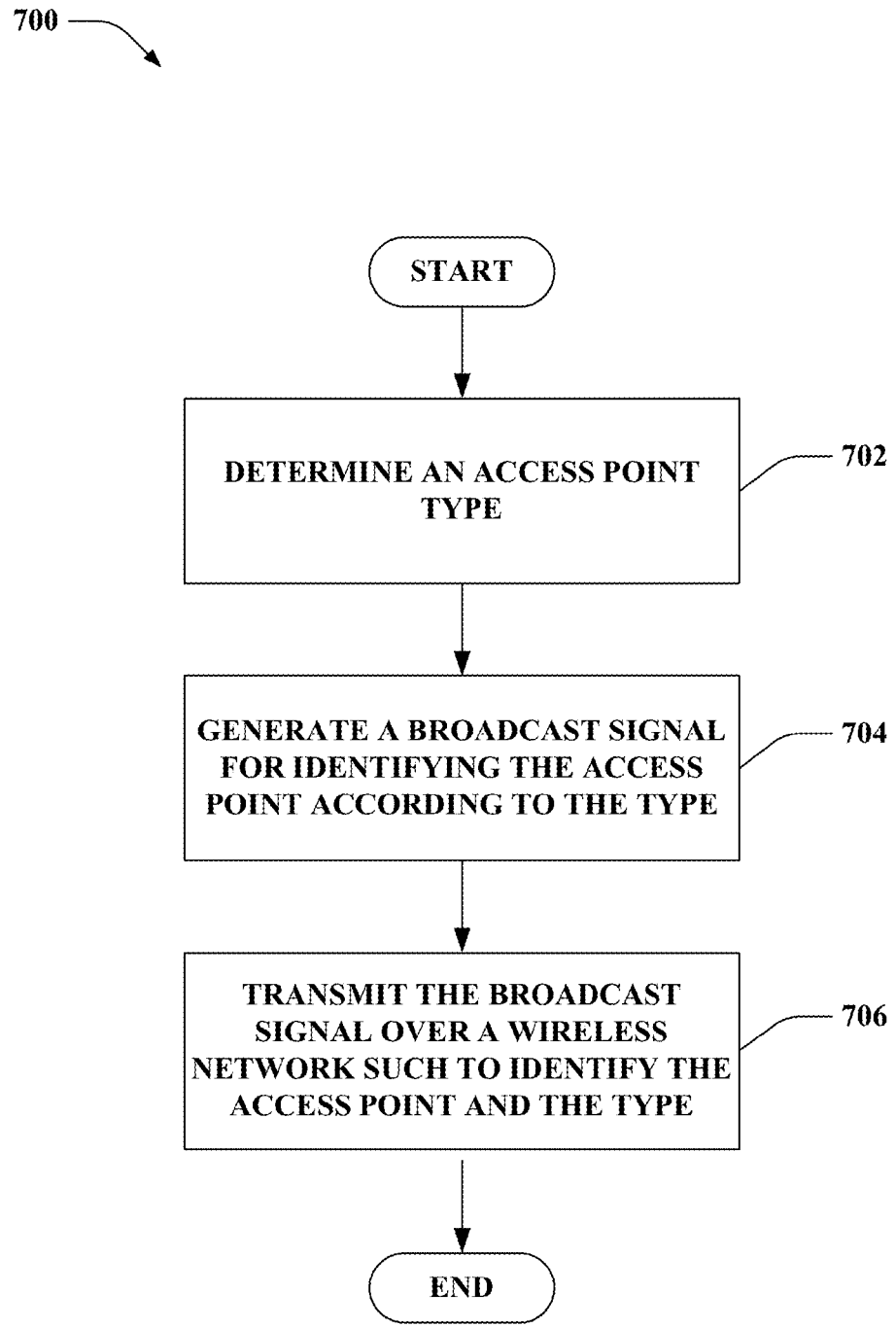
FIG. 7 is an illustration of an example methodology that facilitates generating broadcast signals to indicate restricted association or access point type information.

Referring to FIGS. 5-7, methodologies relating to cell reselection and broadcasting access point types and/or restricted association indicators are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates cell reselection in wireless communications is displayed. At 502, surrounding cells are measured to determine one or more parameters related thereto. As described, the parameters can relate to communication metrics, such as signal strength, throughput, etc. and/or one or more additional considerations, such as an access point identifier, a group identifier, sector identifier, services offered, a related access provider, etc. In addition, the parameters can relate to the cell being provided by a home access point, which provides enhanced billing aspects, additional service or speeds, and/or the like. The parameters can also relate to offsets or hysteresis to increase consideration of desirable access points (such as a home access point, for example) and/or decrease consideration of other access points. At 504, the surrounding cells can be ranked according to the determined parameters. The ranking can indicate an order of desirable cells from which to receive wireless communication services.

At 506, it can be determined whether the highest ranked cell is that currently utilized. Such a determination can be utilized to ensure connection with an optimal access point. If the highest ranked cell is the cell currently utilized to receive wireless communications, the method proceeds back to step 502 to again measure surrounding cells. This can be based on a timer, in one example, as to not flood the network with cell measurements or spend resources by constantly measuring the cells. If the highest ranked cell is not the currently utilized cell, at 508, cell reselection can be performed, as described herein, to perform cell reselection to the highest ranked cell. It is to be appreciated, in one example, that once cell reselection is complete, the method, in one example, can proceed back to step 502 to continue measuring surrounding cells. As described, the access points can be base stations, femtocells, and/or the like.

Turning to FIG. 6, illustrated is a methodology 600 that establishes communication with one or more access points in a wireless communications network. At 602, a restricted association indicator can be determined from a received broadcast signal. For example, as described, the indicator can be determined based at least in part on one or more parameters specified within the broadcast signals and/or one or more extrinsic aspects of the signal, such as frequency, utilized subcarriers, interval, periodicity, length, etc., as described. At 604, an access point group identifier can be obtained from the broadcast signal based on the indicator. Thus, where at least some restricted association is indicated by the indicator, the group identifier can be determined to ensure access can be received from the access point. In this regard, at 606, it can be determined whether the group identifier is in a maintained list of accessible group identifiers. The list can be maintained to mitigate spending resources requesting connection with access points for which access will likely be denied based on the group identifier (e.g., the identifier can be related to a provider of the access point which restricts devices to which it will provide access). At 608, communication can be established with a related access point where the identifier is in the maintained list. This can be an initial communication establishment and/or cell reselection, as described previously.

Turning to FIG. 7, illustrated is a methodology 700 that transmits information regarding an access point and/or a type thereof. At 702, an access point type is determined; this can be related to one or more restricted association implementations, for example. The types can relate to restricted association or not restricted association, or can be an enumeration of types indicating varying levels of restriction, for example, as described. At 704, a broadcast signal can be generated for identifying the access point according to the type. The signal can include parameters related to the access point type, in one example, and/or parameters related to identifying a related group of the access point. At 706, the broadcast signal can be transmitted over a wireless network such to identify the access point and the type. Thus, as described, the broadcast signal can be transmitted in such a way to indicate a type of the access point. For example, an interval, periodicity, frequency, length, etc. of a broadcast signal can indicate the type as determined by one or more mobile devices. This facilitates efficient identification such that a mobile device can interrogate further where a restricted association type is indicated as opposed to a non-restricted type, as described.

It will be appreciated that, in accordance with one or more aspects described herein, inferences can be made regarding many aspects of cell reselection, such as measuring the parameters, ranking the cells according to the parameters (and/or additional parameters), and even aspects of actual reselection (such as when to perform the reselection, etc.) as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In one example, inferences can additionally be made in determining parameters of cells during measurement based at least in part on receiving further information from one or more mobile devices.

Figure 8:
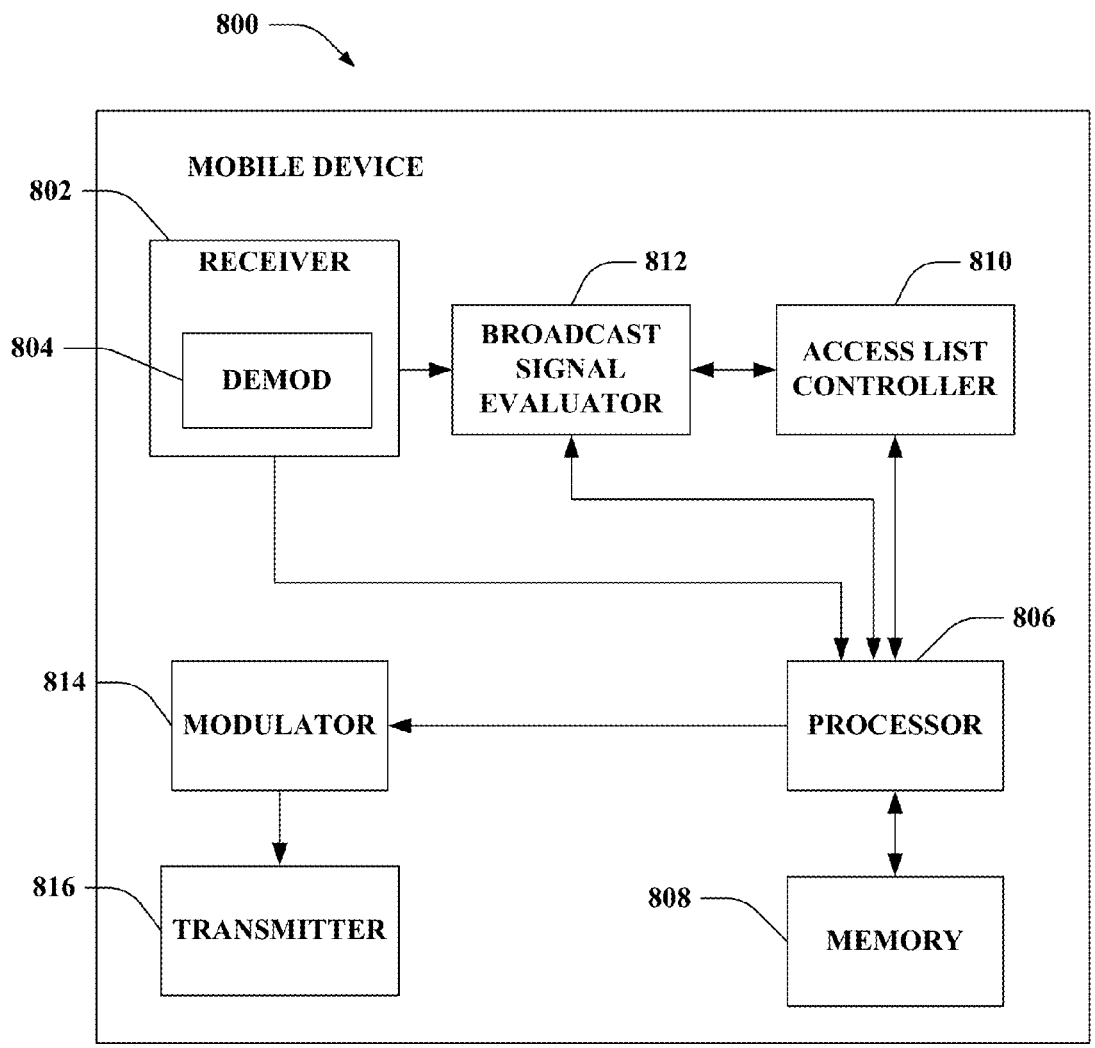
FIG. 8 is an illustration of an example mobile device that facilitates analyzing broadcast signals to obtain access point information.

FIG. 8 is an illustration of a mobile device 800 that facilitates determining aspects related to access points based at least in part on broadcast signals. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can further be operatively coupled to an access list controller 810 that can maintain a list of accessible access points. As described, the list can comprise identifiers for restricted association access points and/or groups related thereto. In this regard, the access list controller 810 can be consulted in requesting access to a restricted association access point. This can ensure that the mobile device 800 does not expend resources requesting connection establishment with access points for which association is restricted with respect to the mobile device 800. In addition, processor 806, and/or receiver 802, can further be operatively coupled to a broadcast signal evaluator 812 that can analyze broadcast signals received from disparate access points to determine restricted association information related to the access points.

For example, the broadcast signal evaluator 812 can determine a restricted association indicator, as described, based at least in part on one or more intrinsic aspects (e.g., parameters) and/or extrinsic aspects (e.g., frequency, interval, periodicity, etc.) of the broadcast signal. Using this information, the mobile device 800 can efficiently determine whether it needs to request additional information, such as an access point group identifier (which can also be indicated by the broadcast signal) for verification by the access list controller 810. Mobile device 800 still further comprises a modulator 814 and transmitter 816 that respectively modulate and transmit signals to, for instance, a base station, another mobile device, etc. Although depicted as being separate from the processor 806, it is to be appreciated that the access list controller 810, broadcast signal evaluator 812, demodulator 804, and/or modulator 814 can be part of the processor 806 or multiple processors (not shown).

Figure 9:
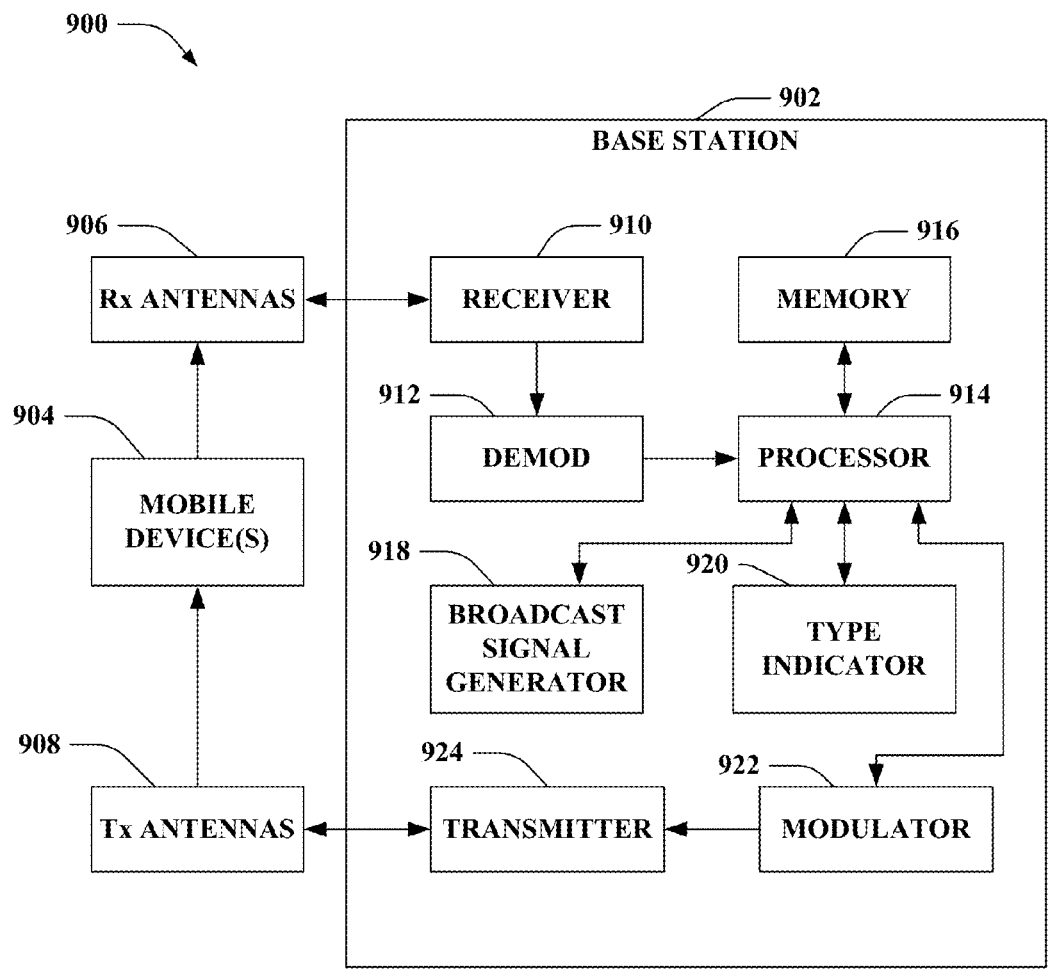
FIG. 9 is an illustration of an example system that generates broadcast signals comprising access point information indicators.

FIG. 9 is an illustration of a system 900 that facilitates specifying restricted association information in broadcast signals transmitted repeatedly over wireless communication networks. The system 900 comprises a base station 902 (e.g., access point, femtocell, . . . ) with a receiver 910 that receives signal(s) from one or more mobile devices 904 through a plurality of receive antennas 906, and a transmitter 924 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to a broadcast signal generator 918 that generates a broadcast signal to identify the base station 902 to one or more mobile devices 904 and a type indicator 920 that specifies a base station type using the broadcast signal.

According to an example, the broadcast signal generator 918 can create the broadcast signal, such as a beacon and/or pilot signal, and the type indicator 920 can specify parameters related to the type in the signal. The parameters can relate to specifying one or more restricted association implementations related to the base station. In addition or alternatively, the type indicator 920 can specify parameters for transmitting the broadcast signals based at least in part on type. The parameters can relate to, for example, intervals for transmitting the broadcast signal, periodicity for transmission, frequency, subcarriers to utilize, length, and/or the like, as described. The transmitter 924 can broadcast the signal according to the parameters. In either case, the mobile device(s) 904, as described, can identify restricted association and/or type information related to the base station 902. Furthermore, although depicted as being separate from the processor 914, it is to be appreciated that the broadcast signal generator 918, type indicator 920, demodulator 912, and/or modulator 922 can be part of the processor 914 or multiple processors (not shown).

Figure 10:
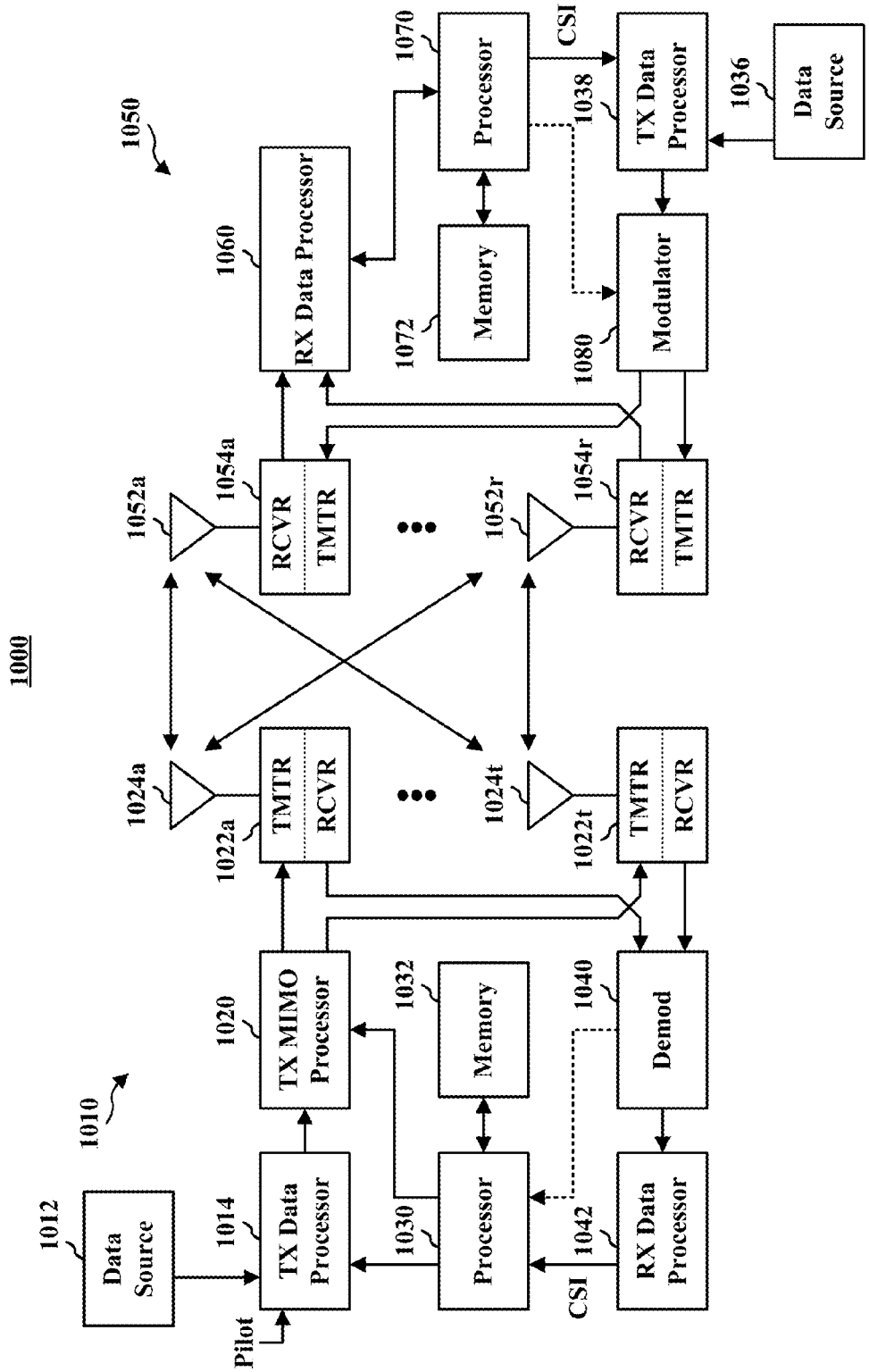
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4 and 8-9) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
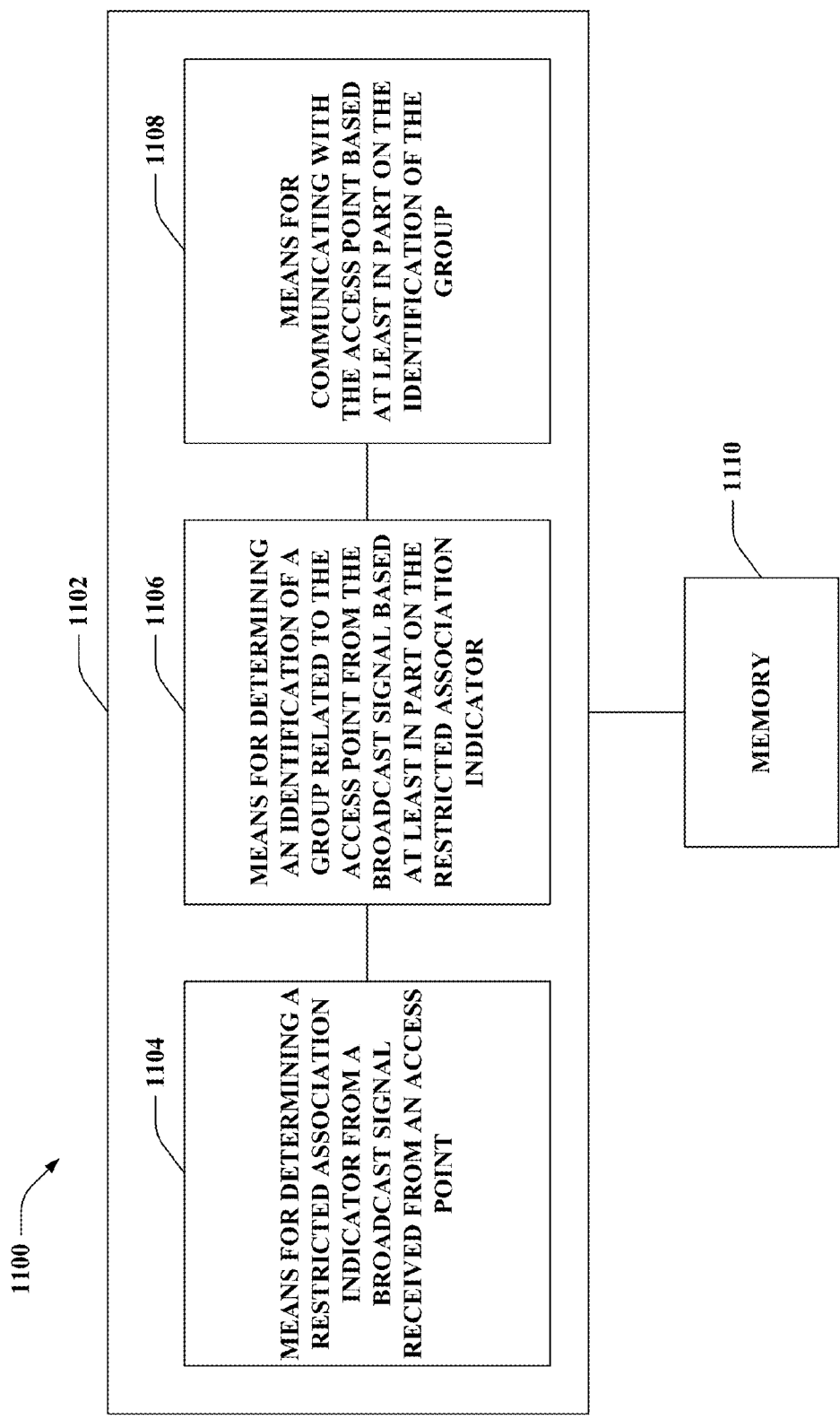
FIG. 11 is an illustration of an example system that evaluates broadcast signals to determine access point information.

Turning to FIG. 11, illustrated is a system 1100 that determines restricted association information related to one or more access points in wireless communication networks. System 1100 can reside within a base station, femtocell, mobile device, etc., for instance. As depicted, system 1100 includes functional blocks that can represent functions implemented by a processor, software, or combination thereof (e.g., firmware). System 1100 includes a logical grouping 1102 of electrical components that act in conjunction. Logical grouping 1102 can include means for determining a restricted association indicator from a broadcast signal received from an access point 1104. As described, the indicator can be determined from one or more intrinsic aspects of the signal, such as one or more parameters, and/or extrinsic aspects, such as signal frequency, interval, periodicity, utilized subcarriers, etc. Moreover, logical grouping 1102 can include means for determining an identification of a group related to the access point from the broadcast signal based at least in part on the restricted association indicator 1106. Thus, if the access point implements restricted association, as previously determined, a related identifier can be received and verified in a maintained list of identifiers, for example. Further, logical grouping 1102 can include means for communicating with the access point based at least in part on the identification of the group 1108. As described, the communication can include initial connection establishment and/or performing cell reselection to the access point. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

Figure 12:
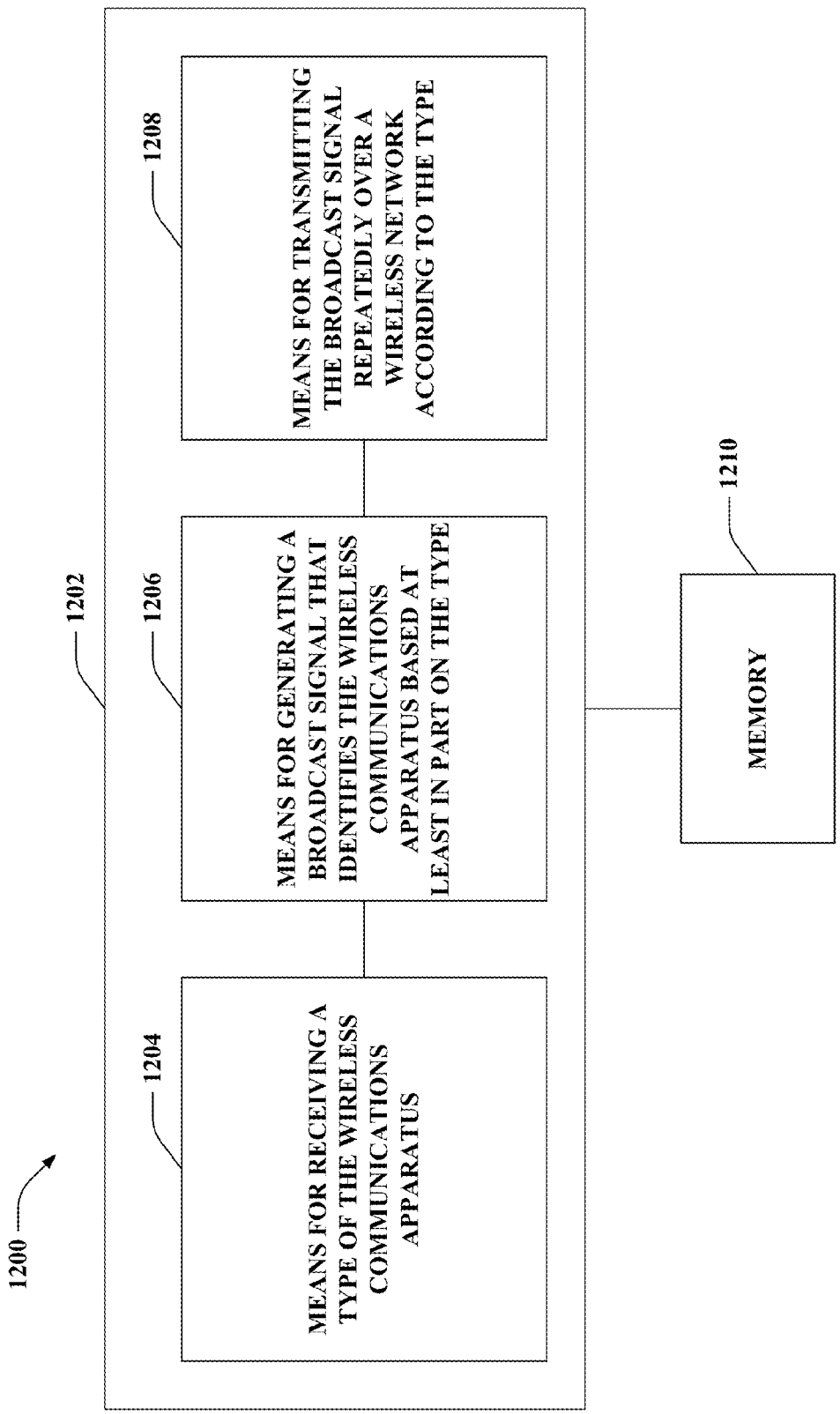
FIG. 12 is an illustration of an example system that includes access point information in related broadcast signals.

Referring now to FIG. 12, illustrated is a system 1200 that specifies access point type and/or restricted association information in broadcast signals of wireless communication networks. System 1200 can reside within a base station, femtocell, mobile device, etc., for instance. As depicted, system 1200 includes functional blocks that can represent functions implemented by a processor, software, or combination thereof (e.g., firmware). System 1200 includes a logical grouping 1202 of electrical components that can facilitate specifying type information in broadcast signals. Logical grouping 1202 can include means for receiving a type of the wireless communications apparatus 1204; the wireless communications apparatus can be the system 1200. As described, the type can relate to restricted association indicators and/or enumerations of indicators for varying levels of restriction. Moreover, logical grouping 1202 can include means for generating a broadcast signal that identifies the wireless communications apparatus based at least in part on the type 1206. The broadcast signal can be generated to include parameters related to the type, in one example. In addition, other aspects of the signal can be modified to indicate such. Thus, logical grouping 1202 can include means for transmitting the broadcast signal repeatedly over a wireless network according to the type 1208. As described, aspects of signal transmission, such as length, interval, periodicity, frequency, and/or the like can be utilized to determine the type and/or restricted association information. Additionally, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for specifying access point information in broadcast signals transmitted over a wireless communication network, comprising:
   determining an access point type, wherein the access point type indicates whether an access point implements restricted association with one or more mobile devices and a level of the restricted association, and wherein the level of the restricted association indicates that the access point restricts all or part of signaling access, data access, registration access, and service access with the one or more mobile devices;

generating a broadcast signal that identifies the access point based at least in part on the access point type; and transmitting the broadcast signal repeatedly over the wireless communication network according to the access point type.

2. The method of claim 1, further comprising including an access point group identifier in the broadcast signal.

3. The method of claim 1, wherein transmitting the broadcast signal is performed at an interval indicative of the access point type.

4. The method of claim 1, wherein transmitting the broadcast signal is performed at a frequency range indicative of the access point type.

5. The method of claim 1, wherein the access point type is specified within the broadcast signal.

6. The method of claim 1, wherein the restricted association implemented by the access point relates to providing at least one of signaling, data, registration, and service to the one or more mobile devices.

7. A wireless communications apparatus, comprising:
at least one processor configured to:
receive a type of the wireless communications apparatus, wherein the type indicates whether the wireless communications apparatus implements restricted association with one or more mobile devices and a level of the restricted association, and wherein the level of the restricted association indicates that the wireless communications apparatus restricts all or part of signaling access, data access, registration access, and service access with the one or more mobile devices;
generate a broadcast signal that identifies the wireless communications apparatus based at least in part on the type; and
transmit the broadcast signal repeatedly over a wireless network to identify the type; and
a memory coupled to the at least one processor.

8. The wireless communications apparatus of claim 7, wherein said at least one processor is further configured to include an access point group identifier in the broadcast signal.

9. The wireless communications apparatus of claim 7, wherein said at least one processor is configured to transmit the broadcast signal at an interval indicative of the type.

10. The wireless communications apparatus of claim 7, wherein said at least one processor is configured to transmit the broadcast signal at a frequency range indicative of the type.

11. The wireless communications apparatus of claim 7, wherein the type is specified within the broadcast signal.

12. The wireless communication apparatus of claim 7, wherein the restricted association implemented by the wireless communications apparatus relates to providing at least one of signaling, data, registration, and service to the one or more mobile devices.

13. A wireless communications apparatus that facilitates indicating restricted association in wireless communications, comprising:
means for receiving a type of the wireless communications apparatus, wherein the type indicates whether the wireless communications apparatus implements restricted association with one or more mobile devices and a level of the restricted association, and wherein the level of the restricted association indicates that the wireless communications apparatus restricts all or part of signaling access, data access, registration access, and service access with the one or more mobile devices;
means for generating a broadcast signal that identifies the wireless communications apparatus based at least in part on the type; and
means for transmitting the broadcast signal repeatedly over a wireless network according to the type.

14. The wireless communications apparatus of claim 13, further comprising means for including an access point group identifier in the broadcast signal.

15. The wireless communications apparatus of claim 13, further comprising means for transmitting the broadcast signal at an interval indicative of the type.

16. The wireless communications apparatus of claim 13, further comprising means for transmitting the broadcast signal at a frequency range indicative of the type.

17. The wireless communications apparatus of claim 13, wherein the type is specified within the broadcast signal.

18. The wireless communication apparatus of claim 13, wherein the restricted association implemented by the wireless communications apparatus relates to providing at least one of signaling, data, registration, and service to the one or more mobile devices.

19. A computer program product, comprising:
a non-transitory computer-readable medium comprising:
code for causing at least one computer to determine an access point type, wherein the access point type indicates whether an access point implements restricted association with one or more mobile devices and a level of the restricted association, and wherein the level of the restricted association indicates that the access point restricts all or part of signaling access, data access, registration access, and service access with the one or more mobile devices;
code for causing the at least one computer to generate a broadcast signal that identifies the access point based at least in part on the access point type; and
code for causing the at least one computer to transmit the broadcast signal repeatedly over a wireless network according to the access point type.

20. The computer program product of claim 19, wherein said non-transitory computer-readable medium further comprises code for including an access point group identifier in the broadcast signal.

21. The computer program product of claim 19, wherein said non-transitory computer-readable medium further comprises code for transmitting the broadcast signal at an interval indicative of the access point type.

22. The computer program product of claim 19, wherein said non-transitory computer-readable medium further comprises code for transmitting the broadcast signal at a frequency range indicative of the access point type.

23. The computer program product of claim 19, wherein the access point type is specified within the broadcast signal.

24. The computer program product of claim 19, wherein the restricted association implemented by the access point relates to providing at least one of signaling, data, registration, and service to the one or more mobile devices.

25. An apparatus configured for wireless communication, comprising:
a restricted association specifier that specifies a restricted association indicator related to a determined type of the apparatus, wherein the determined type of the apparatus indicates whether the apparatus implements restricted association with one or more mobile devices and a level of the restricted association, and wherein the level of the restricted association indicates that the apparatus restricts all or part of signaling access, data access, registration access, and service access with the one or more mobile devices; and a broadcast signal generator that creates a broadcast signal based at least in part on the restricted association indicator; and a transmitter that repeatedly transmits the broadcast signal over a wireless network according to the restricted association indicator.

26. The apparatus of claim 25, wherein the broadcast signal generator includes an access point group identifier in the broadcast signal.

27. The apparatus of claim 25, wherein the transmitter transmits the broadcast signal at an interval indicative of the restricted association indicator.

28. The apparatus of claim 25, wherein the transmitter transmits the broadcast signal at a frequency range indicative of the restricted association indicator.

29. The apparatus of claim 25, wherein the broadcast signal generator includes the restricted association indicator within the broadcast signal.

30. The apparatus of claim 25, wherein the restricted association implemented by the apparatus relates to providing at least one of signaling, data, registration, and service to the one or more mobile devices.

* * * * *